US007493361B2

(12) United States Patent
Etoh et al.

(10) Patent No.: US 7,493,361 B2
(45) Date of Patent: Feb. 17, 2009

(54) COMPUTER OPERATION ANALYSIS

(75) Inventors: Hiroaki Etoh, Kanagawa-ken (JP); Ryo Hirade, Miura (JP); Hisashi Kashima, Yamato (JP); Tsuyoshi Ide, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 11/019,879

(22) Filed: Dec. 22, 2004

(65) Prior Publication Data
US 2005/0166081 A1 Jul. 28, 2005

(30) Foreign Application Priority Data
Dec. 26, 2003 (JP) ............... 2003-432337

(51) Int. Cl.
*G06F 15/16* (2006.01)
(52) U.S. Cl. ............... 709/203; 709/217; 709/219; 709/227; 709/229; 714/37
(58) Field of Classification Search ............... 709/203, 709/217, 219, 227, 229; 714/37
See application file for complete search history.

(56) References Cited

U.S. PATENT DOCUMENTS

| | | | | | |
|---|---|---|---|---|---|
| 5,870,760 | A | * | 2/1999 | Demers et al. ............... | 707/201 |
| 6,247,023 | B1 | * | 6/2001 | Hsiao et al. ............... | 707/202 |
| 6,286,046 | B1 | * | 9/2001 | Bryant ............... | 709/224 |
| 7,290,056 | B1 | * | 10/2007 | McLaughlin, Jr. ............... | 709/230 |
| 7,310,777 | B2 | * | 12/2007 | Cirne ............... | 715/763 |
| 2002/0198985 | A1 | * | 12/2002 | Fraenkel et al. ............... | 709/224 |

FOREIGN PATENT DOCUMENTS

| JP | PUPA 05-233397 | 9/1993 |
|---|---|---|
| WO | WO2005/045739 A2 | 5/2005 |

OTHER PUBLICATIONS

HP OpenView Network Node Manager, Managing Your Network with HP OpenView Network Node Manager, Windows, HP-UX and Solaris Operating Systems, Sep. 2003.

(Continued)

*Primary Examiner*—Phuoc H Nguyen
(74) *Attorney, Agent, or Firm*—Scully, Scott, Murphy & Presser, P.C.; Lisa M. Yamonaco

(57) ABSTRACT

Provides an analysis system for analyzing dependencies among server programs in a computer system, comprising: a transaction detection unit for detecting transactions that is processing of a service which each of the plurality of server programs performs by being called from any other server program; a child transaction candidate detection unit for detecting candidates for a child transaction of each detected transaction, the child transaction being called in the transaction concerned; and a calling frequency calculation unit for outputting service calling frequencies obtained by estimating a frequency at which each server program allows each of the other server programs to perform a service by calling the other program, the estimation being made based on the service detected in association with each transaction and on a service detected in association with the candidate for the child transaction of the transaction.

14 Claims, 10 Drawing Sheets

OTHER PUBLICATIONS

Systemwalker Network Topology manager, Fujitus, pp. 1-5, Sep. 22, 2004.
PerformaSure, J2EE Application Performance Assurance, pp. 1-3, Sep. 22, 2004.
Japanese Publication No. 11-259331 published on Sep. 24, 1999.
"Network Node Manager," (online), Internet url: http://www.jpn.hp.com/openview/lineup/network/nnm.
"Systemwalker Network Topology Manager," (online), Internet url: http://systemwalker.fujitsu.com/jp/nettopology/function.
Gupta et al., "Discovering Dynamic Dependencies in Enterprise Environments for Problem Determination," 14th IEIF/IEEE Workshop on Distributed Systems: Operations and Management.
Yoshiki Ohshima, et al., An Implementation of the Concurrent Transaction Mechanism.
Hisahi Kashima, et al., Network-Based Problem Detection for Distributed Systems.

* cited by examiner

COMPUTER OPERATION ANALYSIS

FIELD OF THE INVENTION

The present invention relates to an analysis system, an analysis method, an analysis program, and a recording medium. Particularly, the present invention relates to an analysis system, an analysis method, and an analysis program, which are for analyzing an operation of a computer system, and to a recording medium.

BACKGROUND OF THE INVENTION

In recent years, as a network such as the Internet has been widespread, the World Wide Web (WWW) system has come to be widely used. In the old days, a website only displayed a web page or made simple communication with a reader, and accordingly, the website was composed by only a web server in many cases. However, in recent years, occasions where the website is used for basic operations of an enterprise and the like have been increased, and a variety of servers including the web server, a data base server, an application server and the like have come to be connected to the network and to function as the website in collaboration with one another.

When a configuration of the website becomes complicated as described above, in the case where some malfunctions occur in the operation of the website, it becomes difficult to determine a server where a failure has occurred. Moreover, even if the failure has occurred, the server is sometimes provided redundantly for the purpose of continuing the operation of the website, and in this case, it becomes further difficult to analyze the failure. As an example, a plurality of DNS (Domain Name System) servers are sometimes provided in the network. For example, when a server cannot make an inquiry to a primary DNS server, the server makes an inquiry to a secondary DNS server, thus making it possible to acquire a desired IP address. In such a case, a failure caused in the primary DNS server is sometimes overlooked.

The following documents are considered:
[Patent Document 1] Japanese Patent Laid-Open No. H11 (1999)-259331
[Non-Patent Document 1] "Network Node Manager", [online], [retrieved on Dec. 22, 2003], Internet <URL: http://www.jpn.hp.com/openview/lineup/network/nnm/>
[Non-Patent Document 2] "Systemwalker Network Topology Manager", [online], [retrieved on Dec. 22, 2003], Internet<URL: http://systemwalker.fujitsu.com/jp/net-topology/function/>
[Non-Patent Document 3] "J2EE pafomansu shindan tsuru (J2EE Performance Diagnosis Tool)", [online], [retrieved on Dec. 22, 2003], Internet <URL: http://www.grapecity.com/japan/support/database/P2_203.htm>
[Non-Patent Document 4] "Discovering Dynamic Dependencies in Enterprise Environments for Problem Determination", Manish Gupta et al, 14th IEIF/IEEE Workshop on Distributed Systems: Operations and Management Heretofore, as a technique for detecting/analyzing the failure in the network, there is used a technology for analyzing communications among network devices in a manner that packets flowing through the network are monitored or information concerning the communications is acquired from the network devices such as routers (refer to Non-Patent Document 1 and Non-patent Document 2). According to this technology, a communication state in a physical layer, a data link layer or a network layer in an OSI layer model can be analyzed. However, according to this technology, a processing status in the application layer cannot be detected. Therefore, it is difficult to analyze a relationship in which services provided by the respective server programs depend on one another.

For example, in general, even if the failure does not occur, an amount of the packets flowing through the network fluctuates, for example, periodically. An amount of the packets flowing through the network also changes when the failure occurs in a server program, and it is difficult to differentiate this change of amount from the periodical fluctuation. Moreover, a large amount of packets flow through the network for a variety of purposes, and when the amount of packets, which changes due to the failure, is slight, the occurrence of failure cannot be detected in some cases. For example, in the case where the above-described DNS servers are receiving inquiries from a large number of server programs, it is difficult to detect a failure that has occurred only in an inquiry from a specific server program.

For this problem, heretofore, a technology for detecting/analyzing the processing status in the application layer has been proposed. For example, there is used a technology for detecting a server program that may be affected by the failures of the respective server programs, based on connection topology in which the respective servers are interconnected through the network, and based on configuration files of the server programs operating in the respective servers (refer to Patent Document 1). Moreover, there is used a technology for analyzing an influence given by each server program to the other server program in a system constructed in accordance with J2EE (Java 2 Enterprise Edition, "Java" is a registered trademark) (refer to Non-Patent Document 3). Moreover, there is used a technology for analyzing a relationship in which calls for services depend on one another in a manner that a plurality of server programs accumulate logs recording calls made to one another for services (refer to Non-Patent Document 4).

However, the technology of Patent Document 1 only analyzes statically the influences which the plurality of server programs may give to one another, and it is difficult for the technology to dynamically analyze the information concerning the communications actually performed through the network. Furthermore, when a detailed implementation method of the server programs is closed, contents of the configuration files of the server programs are unknown, and accordingly, the dependencies cannot be properly analyzed. Moreover, the technology of Non-Patent Document 3 is only applicable to systems constructed in accordance with the J2EE, and it is difficult to apply the technology to a common network. Moreover, the technology of Non-patent Document 4 can analyze a relationship in which transactions that are processing of calling the services depend on one another; however, the technology cannot obtain a frequency at which the respective services are called from the other respective services.

SUMMARY OF THE INVENTION

In this connection, it is an object of the present invention to provide an analysis system, an analysis method, an analysis program, and a recording medium, which are capable of solving the foregoing problems. This object is achieved by combinations of features described in independent claims in the scope of claims. Moreover, dependent claims prescribe further advantageous concrete examples of the present invention.

In order to solve the foregoing problems, in a first aspect of the present invention, a computer system is provided in which a plurality of server programs providing services to one another operate, an analysis system for analyzing dependencies among the server programs, comprising: a transaction detection unit for detecting transactions in association with a service which each of the plurality of server programs performs by being called from any other server program, the transaction being processing of the service; a child transaction candidate detection unit for detecting candidates for a child transaction of each transaction detected by the transaction detection unit, the child transaction being another transaction called in the transaction; and a calling frequency calculation unit for calculating and outputting service calling frequencies obtained by estimating a frequency at which each server program allows each of the other server programs to perform a service by calling the other program, the estimation being made based on the service detected in association with each transaction and on a service detected in association with the candidate for the child transaction of the transaction Note that the above-described summary of the invention is not an exhaustive listing of all features of the present invention. Subcombinations of groups of these features can also be incorporated in the invention. According to the present invention, the relationship in which the respective services on the network depend on one another can be detected/analyzed.

BRIEF DESCRIPTION OF THE DRAWINGS

For a more complete understanding of the present invention and the advantages thereof, reference is now made to the following description taken in conjunction with the accompanying drawings; in which.

DETAILED DESCRIPTION OF THE INVENTION

The present invention provides a computer system in which a plurality of server programs providing services to one another operate. In an example embodiment, an analysis system for analyzing dependencies among the server programs, comprises: a transaction detection unit for detecting transactions in association with a service which each of the plurality of server programs performs by being called from any other server program, the transaction being processing of the service; a child transaction candidate detection unit for detecting candidates for a child transaction of each transaction detected by the transaction detection unit, the child transaction being another transaction called in the transaction; and a calling frequency calculation unit for calculating and outputting service calling frequencies obtained by estimating a frequency at which each server program allows each of the other server programs to perform a service by calling the other program, the estimation being made based on the service detected in association with each transaction and on a service detected in association with the candidate for the child transaction of the transaction. Moreover, provided are, an analysis method, an analysis program, and a recording medium for recording the analysis program. According to the present invention, the relationship in which the respective services on the network depend on one another can be detected/analyzed.

The present invention will be described below through an embodiments thereof. However, the embodiments described below do not limit the invention according to the scope of claims, and not all combinations of features described in the embodiment are always essential to the solving means of the present invention.

Figure 1:
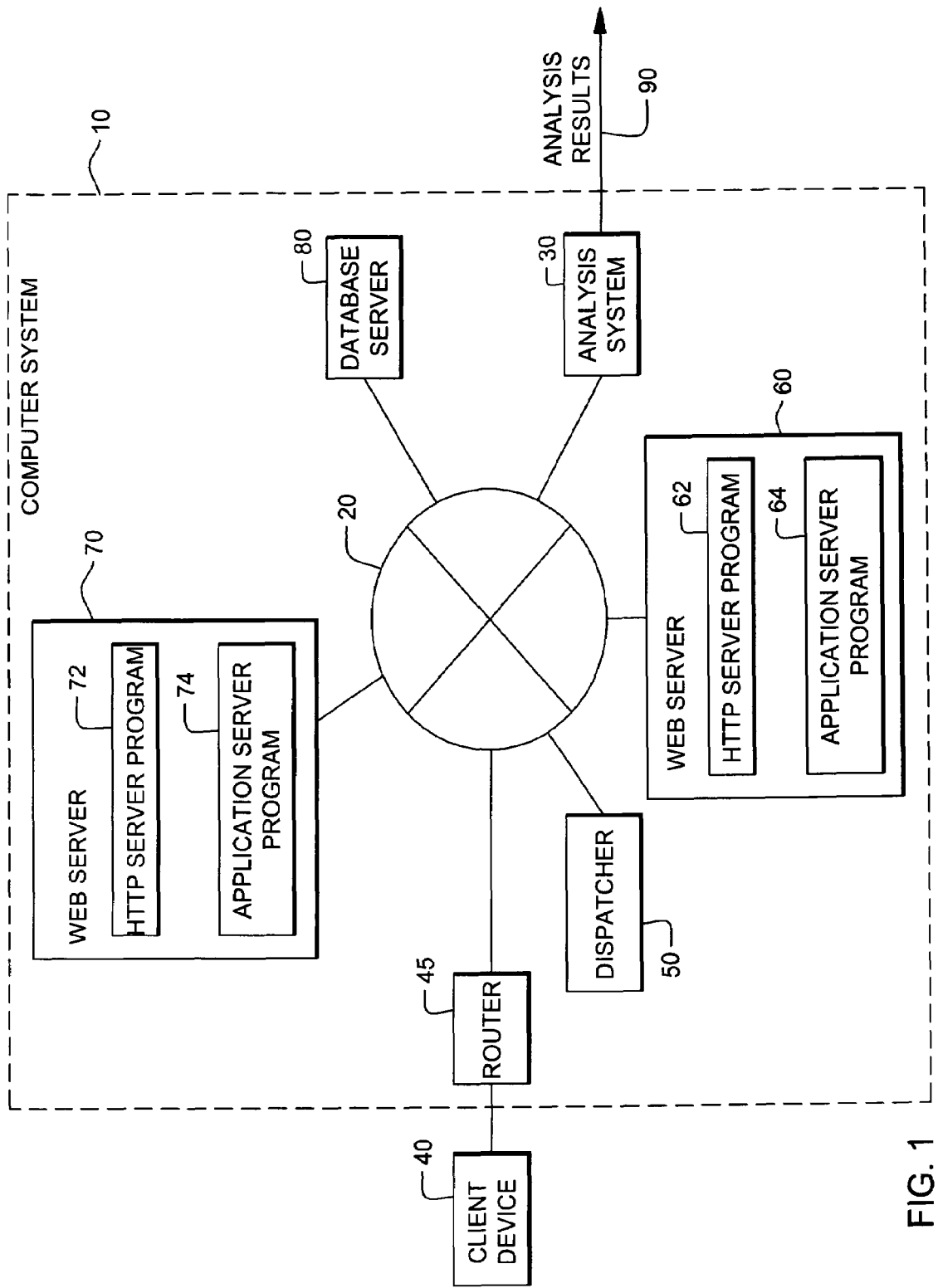
FIG. 1 illustrates a block diagram of a computer system 10.

FIG. 1 illustrates a block diagram of a computer system 10. The computer system 10 includes a router 45. Moreover, the computer system 10 includes an analysis system 30, a dispatcher 50, a web server 60, a web server 70, and a database server 80, which are interconnected through a network 20, and each of which is an example of a server device. The dispatcher 50 receives a request to display a web page and so on from a client device 40, and sends the request to any of the web server 60 and the web server 70. The web server 60 includes an HTTP server program 62 for performing processing such as the display of the web page in response to the request received from the dispatcher 50, and an application server program 64 for creating information to be displayed. In a similar way, the web server 70 includes an HTTP server program 72, and an application server program 74. For example, the web server 60 or the web server 70 may store data received from the client device 40 in the database server 80, and may reply to the client device 40 with data acquired from the database server 80 and display the data.

The analysis system 30 has objects to analyze a frequency at which the respective server programs operating on the respective servers in the computer system 10 call one another, and to detect failures of the server programs.

Figure 2:
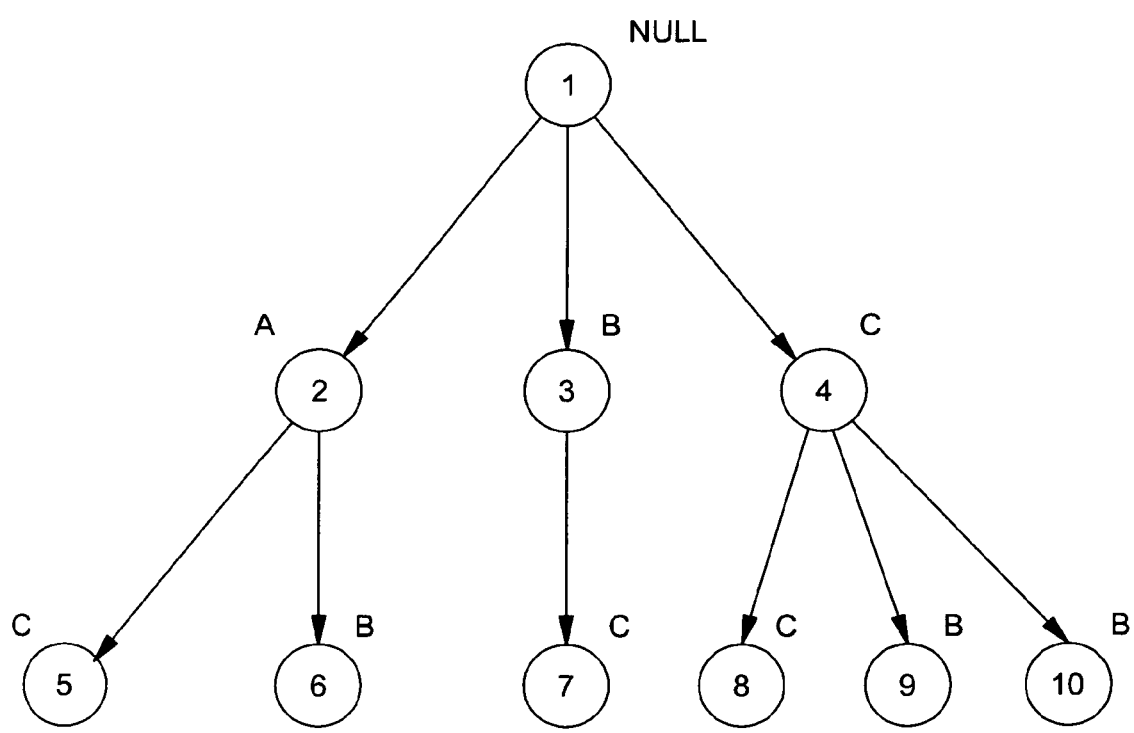
FIG. 2 illustrates a conceptual diagram of processing in which server programs call the other server programs.

FIG. 2 illustrates a conceptual diagram of processing in which the server programs call the other server programs. In this diagram, circles denote transactions. The respective transactions are referred to as first to tenth transactions by use of numbers in the circles. Moreover, symbols added to the circles denote types of services. For example, each of symbols A, B and C applies to any of an HTTP service, an application service and a database service.

Here, the service means processing in which the server programs create necessary data and the like for the other server programs. Therefore, in the following description, the service is treated as a set of an IP address of a server that is a call origination of the service, an IP address of a server that is a call destination of the service, and a type of the service. Moreover, the transaction means processing for a service performed by each server program in response to receipt of an actual call from the other server programs. As an example, the transaction is one for TCP requesting a predetermined service. In the following transaction, the transaction is treated as a set of a start time of the transaction, a finish time of the transaction, and the service processed by the transaction.

Moreover, arrows coupling the transactions to one another indicate that transactions located on tops of the arrows are child transactions called by transactions located on bottoms of the arrows. For example, the second transaction processes the service A, calls the service C as the fifth transaction during the processing of the service A, and calls the service B as the sixth transaction during the processing of the service A. Moreover, the calling means an instruction to process a service and to return a result of the processing. Concretely, the calling is a request for HTTP (Hyper Text Transfer Protocol), an inquiry about an IP address in a DNS, a query to the database service or the like.

Furthermore, this diagram can also be seen to show that the processing of each transaction located on the bottom of the arrow depends on the processing result of each transaction located on the top of the arrow. Specifically, that a certain transaction calls the other transaction may be that the certain transaction cannot complete itself unless the certain transaction does not acquire the processing result of the other transaction.

Moreover, the other transaction calling the certain transaction is referred to as a parent transaction of the certain transaction concerned. For example, the second transaction is a parent transaction of the fifth and sixth transactions. In a similar way, a certain service that has called a transaction to process the other service is referred to as a parent service of the other service. Moreover, though the second to fourth transactions are started without receiving a call from any of the services in the computer system 10, the first transaction is defined as a virtual parent transaction calling the second to fourth transactions for the purpose of facilitating the analysis. Specifically, the first transaction is a virtual transaction that does not process any service at all.

In this diagram, the other transactions called in the processing of the respective transactions and the services processed by these respective transactions are analyzed accurately. However, in the processing of the respective transactions, it is difficult to detect which of the other transactions has been called without concretely analyzing processing contents of all the transactions. In the following embodiment, processing of calculating a service calling frequency in which the analysis system 30 assumes a frequency at which the respective server programs call each of the other server programs and allow the called server program to perform the service will be described.

Figure 3:
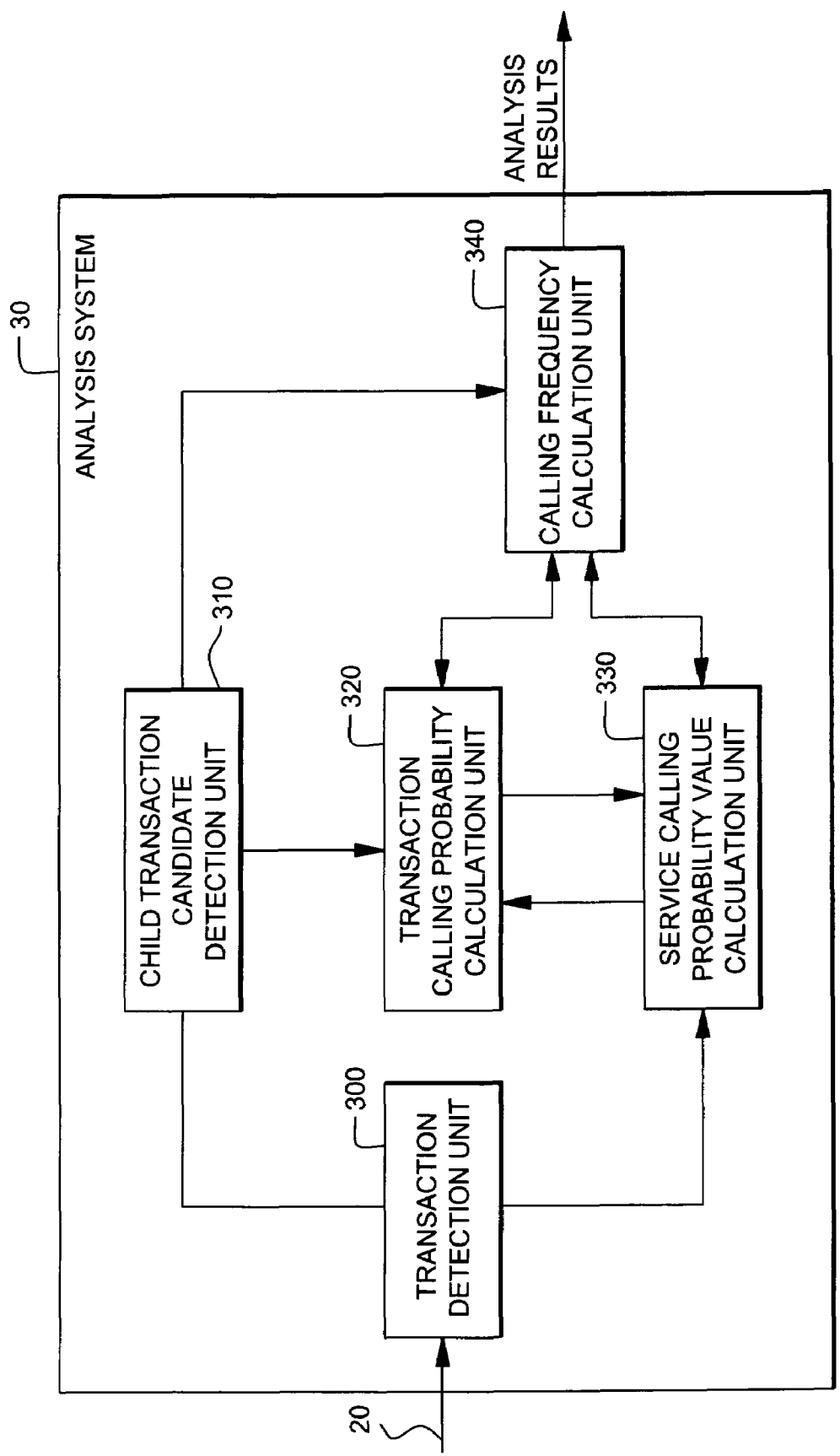
FIG. 3 illustrates a block diagram of an analysis system 30.

FIG. 3 illustrates a block diagram of the analysis system 30. The analysis system 30 includes a transaction detection unit 300, a child transaction candidate detection unit 310, a transaction calling probability calculation unit 320, a service calling probability value calculation unit 330, and a calling frequency calculation unit 340. The transaction detection unit 300 detects, from the network 20, a communication packet for use in calling the transaction in the computer system 10, and thus detects each transaction in association with a service processed by the transaction. For example, as the service associated with the transaction, the transaction detection unit 300 detects a service identified by a destination port number of the detected communication packet.

Moreover, as concrete processing of detecting the communication packet, the transaction detection unit 300 may directly detect a communication packet flowing through the network 20, or may previously record a content of a communication packet received by each server as a log in the server and collect the log. In this case, the transaction detection unit 300 may periodically detect communication packets received during a predetermined period, or may receive the communication packets not from the whole of the computer system 10 but from a predetermined range thereof.

For each transaction detected by the transaction detection unit 300, the child transaction candidate detection unit 310 detects a candidate for a child transaction of the detected transaction. Concretely, for each transaction, the child transaction candidate detection unit 310 detects, as a candidate for a child transaction of the transaction concerned, the other transaction, which defines a server device that is a call destination of the transaction as a call origination, and starts after a start time of the transaction concerned and finishes before a finish time thereof. Then, to the calling frequency calculation unit 340, the child transaction candidate detection unit 310 sends a detection result of the child transaction candidate for each transaction.

Moreover, the case occurs, where the transaction detection unit 300 detects a first transaction, a second transaction starting after the first transaction and finishing before the first transaction, and a third transaction starting after both of the first and second transactions and finishing before both of the first and second transactions. In this case, the child transaction candidate detection unit 310 detects the third transaction as a candidate for a child transaction of the second transaction, and excludes the third transaction from a candidate for a child transaction of the first transaction. Then, to the transaction calling probability calculation unit 320, the child transaction candidate detection unit 310 sends a detection result of the candidate for the child transaction for each transaction when processing of the above-described exclusion is performed.

Figure 4:
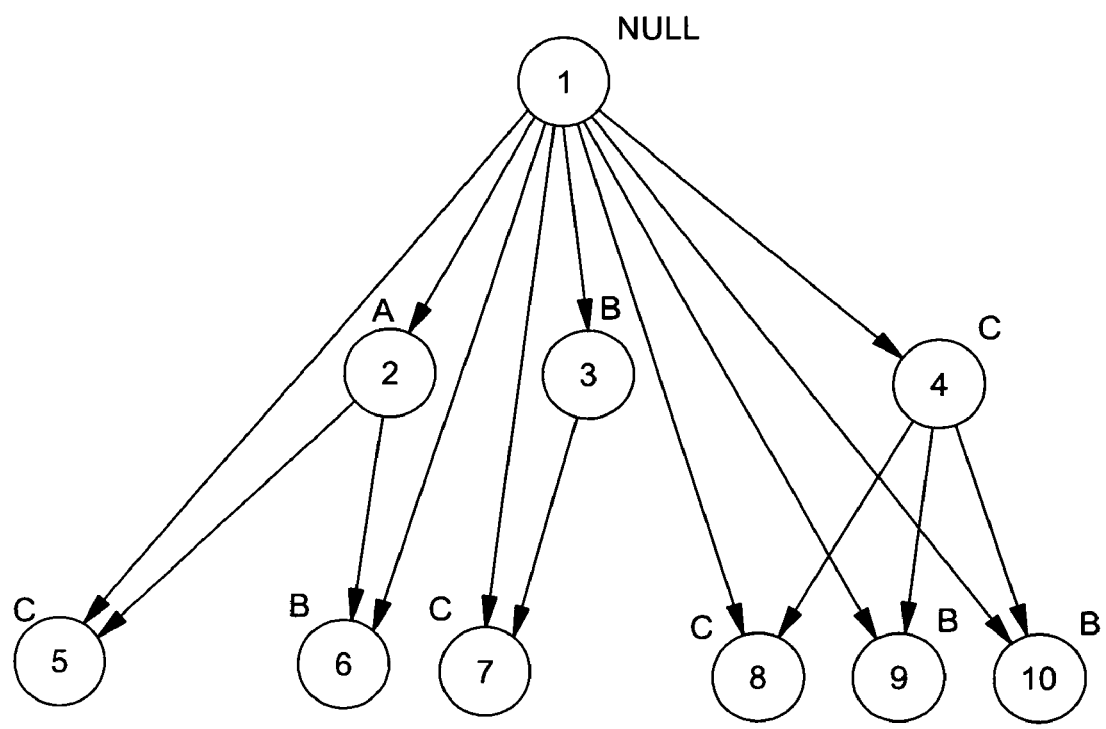
FIG. 4 illustrates, in a DAG (Directed Acyclic Graph), candidates for child transactions, which are detected by a child transaction candidate detection unit 310 for each transaction.

FIG. 4 illustrates, in a DAG (Directed Acyclic Graph), the candidates for the child transactions, which are detected by the child transaction candidate detection unit 310 for each transaction. Unlike in FIG. 2, the actual child transactions cannot be detected accurately; however, the candidates for the child transactions, which have been detected by the child transaction candidate detection unit 310, include the child transactions illustrated in FIG. 2.

Subsequently, based on a service calling probability value that is a estimated value of a probability at which each server program is called from each of the other server programs, and based on each child transaction detected by the child transaction candidate detection unit 310, the transaction calling probability calculation unit 320 calculates a transaction calling probability value that is a probability at which each transaction is called from each of the plurality of server programs. This service calling probability value is predetermined when the transaction calling probability value is calculated for the first time. When the transaction calling probability value is calculated for the second time and after, the service calling probability value is calculated by the service calling probability value calculation unit 330 to be described later.

Then, the service calling probability value calculation unit 330 calculates the new service calling probability value based on the transaction calling probability value for each of the transactions processing the same service. Subsequently, the calling frequency calculation unit 340 repeats processing of acquiring the service calling probability value calculated by the service calling probability value calculation unit 330, and processing of further allowing the transaction calling probability calculation unit 320 to calculate the new transaction calling probability value based on the acquired service calling probability value.

Then, when a difference between the service calling probability value acquired before one step of the iteration and the service calling probability value calculated after one step of the iteration is converged within a predetermined range, the calling frequency calculation unit 340 calculates and outputs the service calling frequency based on the service calling probability values in which the difference is converged within the range. Furthermore, based on the calculated service calling frequency and the detection result of the candidate for each child transaction, which is received from the child transaction candidate detection unit 310, the calling frequency calculation unit 340 calculates and outputs a service calling frequency when, as a result of that a predetermined starting point service is called, the other services are called sequentially in a chained manner.

Figure 5:
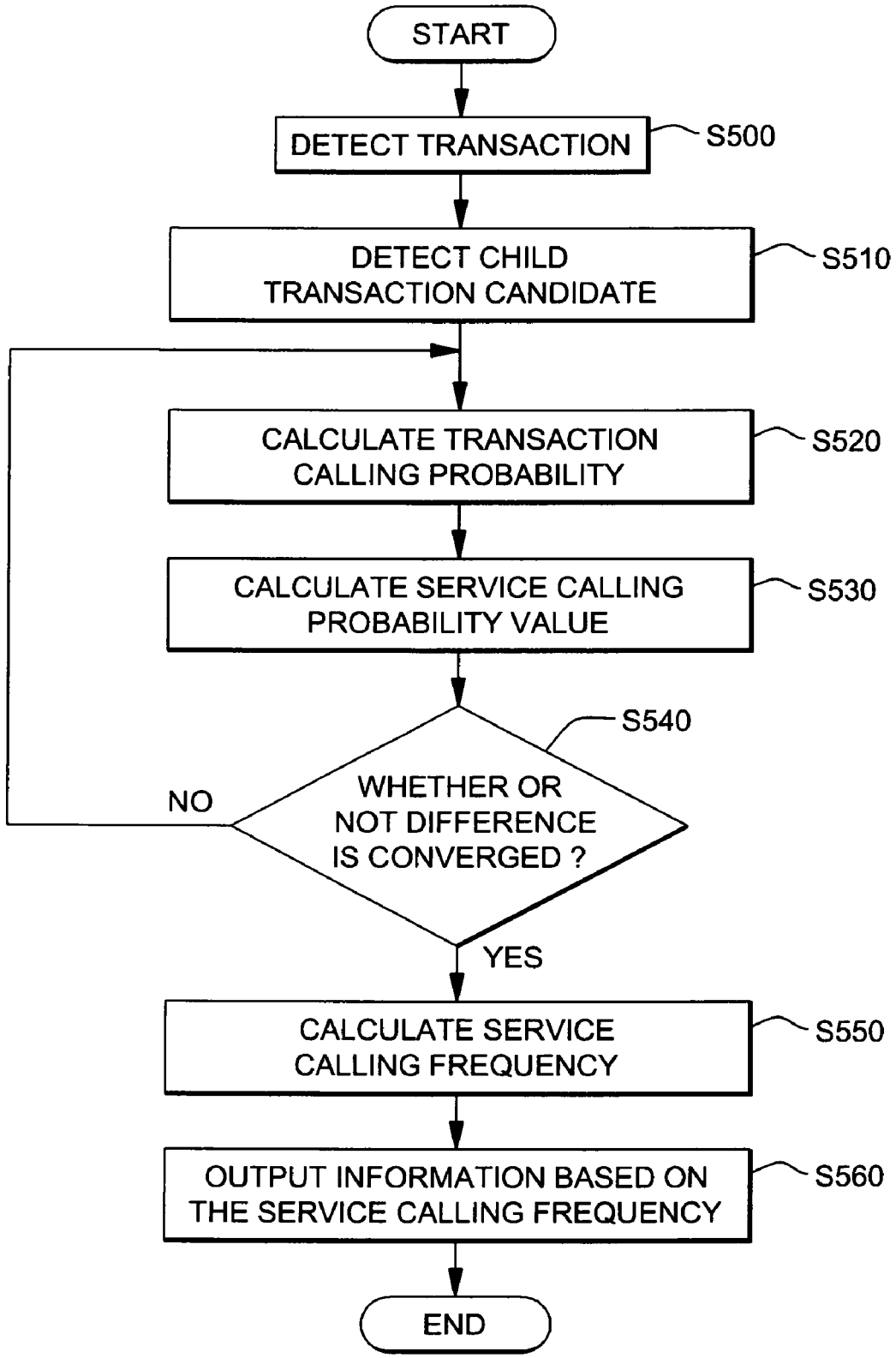
FIG. 5 shows an operation flow of processing in which the analysis system 30 analyzes dependencies among the server programs.

FIG. 5 shows an operation flow of processing in which the analysis system 30 analyzes dependencies among the server programs. The transaction detection unit 300 detects, from the network 20, the communication packet for use in calling the transaction in the computer system 10, and thus detects the transaction (S500). In this case, the transaction detection unit 300 detects the service identified by the destination port number of the detected communication packet as the service associated with the transaction. Moreover, as identification information of the server devices that are the call origination and call destination of the transaction concerned, the transaction detection unit 300 detects an source IP address and destination IP address of the detected communication packet. Furthermore, the transaction detection unit 300 detects the start time and finish time of each transaction in association therewith.

For each transaction detected by the transaction detection unit 300, the child transaction candidate detection unit 310 detects the candidate for the child transaction of the detected transaction (S510). Specifically, for each transaction, the child transaction candidate detection unit 310 detects, as the candidate for the child transaction of the transaction concerned, the other transaction, which defines the server device that is the call destination of the transaction as the call origination, and starts after the start time of the transaction concerned and finishes before the finish time thereof.

The case occurs, where, in this processing, the transaction detection unit 300 detects the first transaction, the second transaction starting after the first transaction and finishing before the first transaction, and the third transaction starting after both of the first and second transactions and finishing before both of the first and second transactions. In this case, the child transaction candidate detection unit 310 detects the third transaction as the candidate for the child transaction of the second transaction. Then, the child transaction candidate detection unit 310 excludes the third transaction from the candidate for the child transaction of the first transaction. Thus, a transaction requiring a longer processing time than the other transactions can be prevented from being estimated as a parent transaction of all of the others, and an estimation result can be prevented from losing reality.

Subsequently, by the transaction calling probability calculation unit 320, the service calling probability value calculation unit 330 and the calling frequency calculation unit 340, the maximum likelihood of the service calling frequency is estimated based on the candidates for the child transactions, which are shown in FIG. 4. Specifically, it is assumed that the service calling frequency $\rho(S_p|S_c)$ follows a probability model represented in the following Equation (1), and this probability model is estimated. In this Equation (1), $Pr(A|B)$ represents a conditional probability at which a condition A is established when a condition B is established, and S represents a set of the services called in the computer system 10.

$$\rho(s_p|s_c) = Pr(s_p \in S \text{ is candidate for parent} \quad [\text{Equation 1}]$$
$$\text{service of } s_c | S_c \in S)$$

$$\sum_{s_p \in S} \rho(s_p|s_c) = 1 \quad (\forall s_c \in S)$$

Details of the processing will be described below. First, based on the service calling probability value and the child transaction for each transaction, which is detected by the child transaction candidate detection unit 310, the transaction calling probability calculation unit 320 calculates the transaction calling probability value that is a probability at which each transaction is called from each of the plurality of server programs (S520). Here, the service calling probability value is set at a predetermined initial value. For example, the service calling probability value is set as: $\rho(\bullet|\bullet)=1/|S|$. By using a service calling candidate value, the processing in which the transaction calling probability calculation unit 320 calculates the transaction calling probability is represented in the following Equation (2).

Note that, as an example of the transaction calling probability, a probability at which a service of a parent transaction of a transaction t is Sp is represented as $\eta(Sp|t)$. Moreover, p(t) represents a candidate for the parent transaction of the transaction t, and P(t) represents a set of the candidates for the parent transaction of the transaction t. Furthermore, serv(t) represents the service to be processed by the transaction t. Then, Serv(P(t)) represents a set listing services of P(t) without any duplication.

$$\eta = (s_p|t) = Pr(serv(p(t)) = s_p | serv(p(t)) \in Serv(P(t))) \quad [\text{Equation 2}]$$
$$= \frac{Pr(serv(p(t)) = s_p, serv(p(t)) \in Serv(P(t)))}{Pr(serv(p(t)) \in Serv(P(t)))}$$
$$= \frac{\rho(s_p|serv(t))}{\sum_{s'=Serv(P(t))} \rho(s'|serv(t))}$$

Then, based on the transaction calling probability value for each of the transactions processing the same service, the service calling probability value calculation unit 330 calculates the other service calling probability value different from the initial value (S530). This processing is represented in the following Equation (3). Here, among the transactions detected by the transaction detection unit 300, the number of transactions processing a certain service s is represented as #(s).

$$\rho(s_p|s_c) = \frac{\sum_{\{t_c | serv(t_c) = s_c\}} \eta(s_p|t_c)}{\#(s_c)} \quad [\text{Equation 3}]$$

Then, the calling frequency calculation unit 340 compares the service calling probability value acquired before one step of the iteration and the service calling frequency value calculated after one step of the iteration with each other (S540). Specifically, the calling frequency calculation unit 340 compares the service calling probability value predetermined before the processing of S520 with the service calling probability value calculated by the processing of S530. When the difference between these service calling probability values is not converted within the predetermined value (S540: NO), the calling frequency calculation unit 340 returns the processing to S520, and repeats the processing in which the transaction calling probability calculation unit 320 is allowed to further calculate the other transaction calling probability value based on the service calling probability value.

Meanwhile, when the difference between these service calling probability values is converged within the predetermined range (S540: YES), the calling frequency calculation unit 340 calculates and outputs the service calling frequency based on the difference in which the service calling probability values are converged within the predetermined range (S550). Furthermore, the calling frequency calculation unit 340 visualizes and outputs information based on the service calling frequency (S560).

Figure 6A:
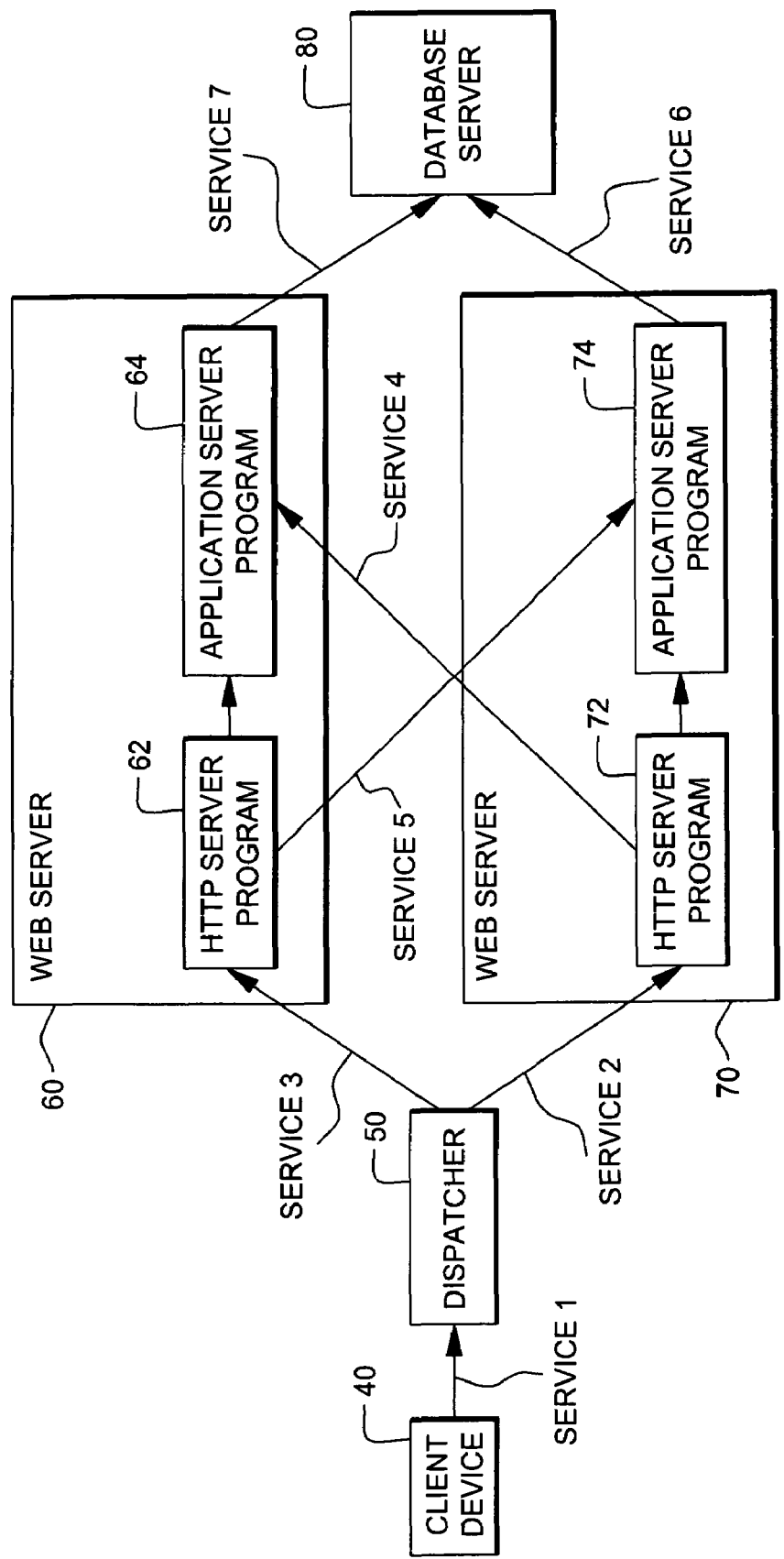
FIGS. 6(a) and 6(b) illustrate an example of service calling frequencies which the analysis system 30 outputs.
Figure 6B:

FIGS. 6(a) and 6(b) illustrate an example of information which the analysis system 30 outputs based on the service calling frequency. FIG. 6(a) corresponds to FIG. 1, and shows a service which each server program allows the other server program to perform by calling the other program. For example, a service which a server program operating on the dispatcher 50 allows the HTTP server program 62 operating on the web server 60 to perform by calling the HTTP server program 62 is referred to as a service 3.

FIG. 6(b) shows service calling frequencies outputted by the calling frequency calculation unit 340. For example, the calling frequency calculation unit 340 outputs 14.36, 78.73 and 114.89 as service calling frequencies at which a service 7 is individually called from a service 1, the service 3 and a service 4. For example, it is assumed that a server program operating on the database server 80 is frequently called from the application server program 64 called from the HTTP server program 72. Moreover, it is assumed that the server program operating on the database server 80 is frequently called from the HTTP server program 62 called from the dispatcher 50. Specifically, it is understood that, in this case, the database server 80 is called more frequently from the web server 60 than from the web server 70.

Moreover, the calling frequency calculation unit 340 calculates 7.82 as a service calling frequency at which the service 4 is called from a service 2, and calculates 5.65 as a service calling frequency at which a service 5 is called from the service 3. Thus, it is understood that the application server program 64 and the application server program 74 are frequently called from the HTTP server program 72 and the HTTP server program 62, respectively.

The calling frequency calculation unit 340 calculates and records the service calling frequencies shown in this table, for example, periodically. Then, in the case where any of the calculated service calling frequencies is different from a predetermined reference value by a predetermined difference value, the calling frequency calculation unit 340 further outputs a message to the effect that the service calling frequency concerned is different from the reference value. This reference value may be a service calling frequency in the case of the past normal operation. Moreover, instead of this, in the case where a frequency at which a certain server program is called from any of the other server programs is different from a predetermined reference frequency, the calling frequency calculation unit 340 may output a message to the effect thereof. Furthermore, in the case where frequencies at which each of the other server programs are called every time when a certain server program is called once are different from a predetermined reference frequency, the calling frequency calculation unit 340 may output a message to the effect thereof.

Moreover, as an output example, as shown in FIG. 6(a), the calling frequency calculation unit 340 may display, for a user, the services which the respective server programs allow the other server programs to perform by calling the other server programs in the form of arrows, and may only display an arrow indicating a service in which the service calling frequency is different from the reference value by blinking the arrow. Moreover, the calling frequency calculation unit 340 may display an alert indicating that the service calling frequency differs from the reference value, and may output a voice telling the state of difference.

Figure 7A:
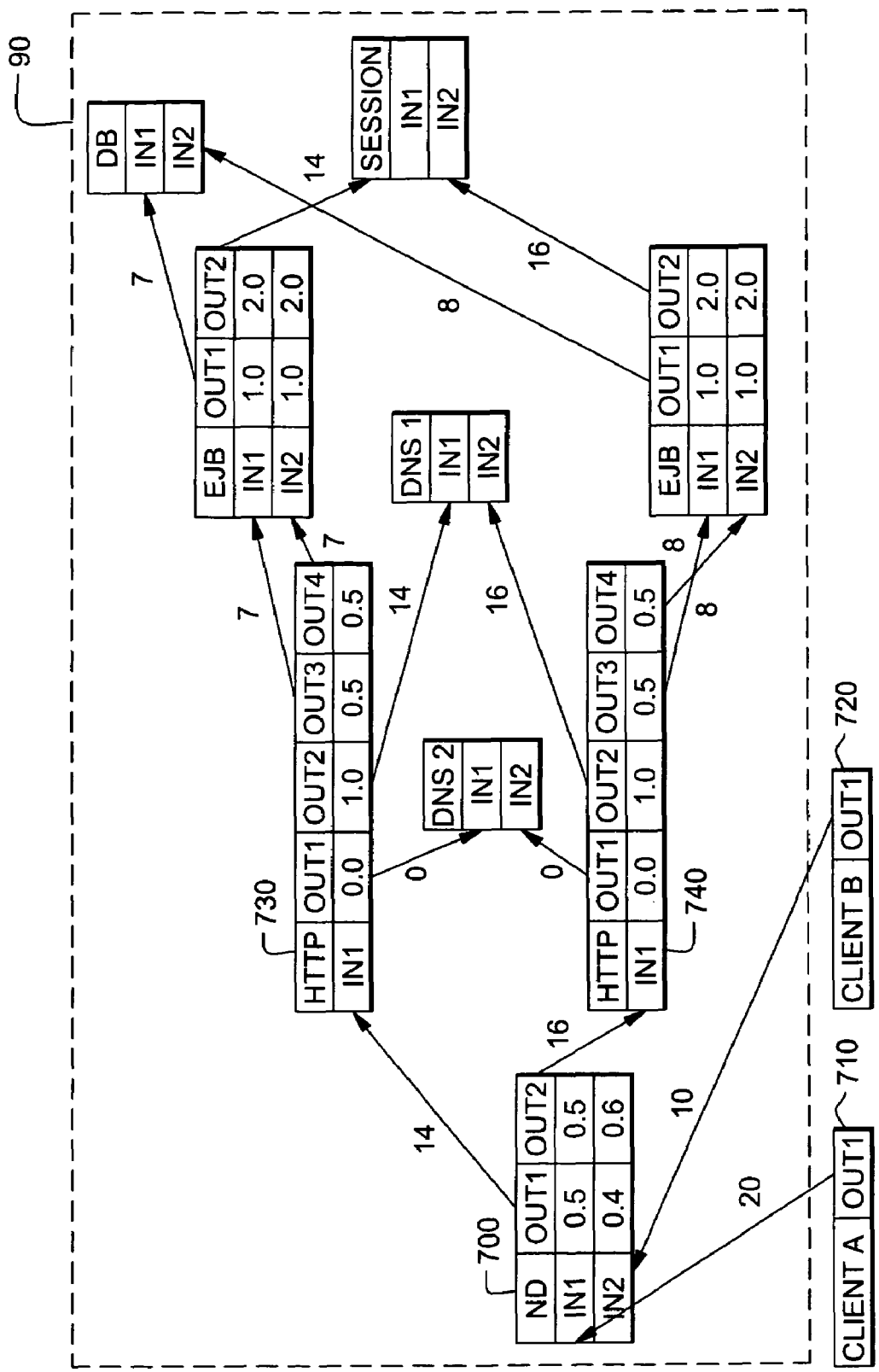
FIGS. 7(a) and 7(b) illustrate another example of the service calling frequencies which the analysis system 30 outputs.
Figure 7B:
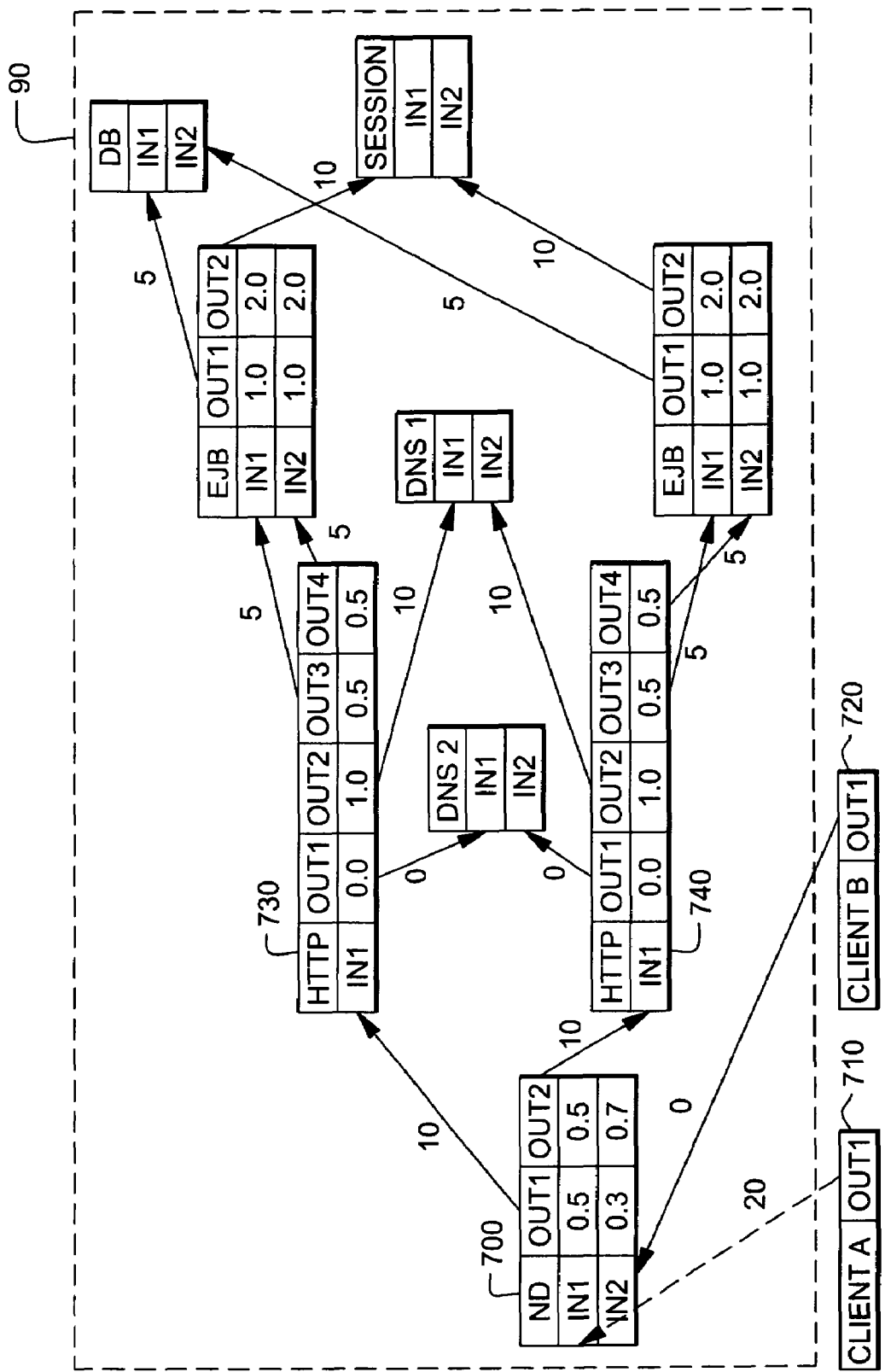

FIGS. 7(a) and 7(b) illustrate another example of the information which the analysis system 30 outputs based on the service calling frequencies. FIG. 7(a) illustrates service calling frequencies for all of the services in the computer system 10. Rectangular regions of this diagram indicate server programs. In addition, numeric values in the rectangular regions indicate estimated values of the number of times in which, every time when the server programs are called once from each of the other server programs, the server programs call the other server programs. These estimated values are obtained by the following Equation (4). Here, #($s_p$, $s_c$) represents an example of the service calling frequencies. This is the number of times in which a service $s_c$ is called in the processing of a certain service $s_p$ (Equation (5)).

$$\pi(s_c \mid s_p) = \frac{\#(s_p, s_c)}{\#(s_p)} \qquad \text{[Equation 4]}$$

$$\#(s_p, s_c) = \#(s_c) \cdot \rho(s_p, s_c) \qquad \text{[Equation 5]}$$

As an example, the calling frequency calculation unit 340 calculates and outputs a 0.5 time as the number of times in which a server program 700 calls a server program 730 every time when the server program 700 is called once from a client program 710 outside of the computer system 10. Meanwhile, the calling frequency calculation unit 340 calculates and outputs a 0.6 time as the number of times in which the server program 700 calls an application program 740 every time when the server program 700 is called once from a client program 720.

Moreover, each arrow in this diagram indicates a calling relationship in which each server program calls the other server program. Moreover, the numeric value added to each arrow indicates the service calling frequency. For example, the calling frequency calculation unit 340 outputs an message to the effect that the server calling frequency at which the server program 700 is called from the client program 710 is 20 times. Meanwhile, the calling frequency calculation unit 340 outputs a message to the effect that the service calling frequency at which the server program 700 is called from the client program 720 is 10 times.

As described above, the calling frequency calculation unit 340 can visualize the service calling frequencies or information based on this service calling frequency in association with the calling relationships between the respective services.

Note that, in this diagram, as representatives of a plurality of server programs outside of the computer system 10, the calling frequency calculation unit 340 displays two server programs (Client A and Client B). Instead of this, as a representative of all of the server programs outside of the computer system 10, the calling frequency calculation unit 340 may display one server program. In this case, even if each server program in the computer system 10 performs the transaction by being called from any external server program, it is satisfactory that the transaction detection unit 300 may detect the same identification information as identification information of a call origination of the transaction concerned.

FIG. 7(b) illustrates service calling frequencies in the case where the starting point service is called in the computer system 10. Specifically, when the user selects an arrow (shown by a dotted line) indicating the call of the client program 710 to the server program 700, the calling frequency calculation unit 340 calculates and displays service calling frequencies in the case where the other server programs are sequentially called by the call in a chained manner. Details of this processing of calculating the service calling frequencies will be described.

First, as a premise of the description, the following parameters are defined. The number of times in which the service s is called in the case where the starting point service $s_o$ is called is represented by the following Equation (6). Moreover, the number of times in which the service $s_c$ is called in the processing of the service $s_p$ in the case where the starting point service $s_o$ is called is represented by Equation (7). Furthermore, the number of times in which the service $s_c$ is called every time when the service $S_p$ is called in the case where the starting point service $s_o$ is called is represented by Equation (8).

$$\#_{s_0}(s) = |\{t \mid t \in T_{s_0}, serv(t) = s\}| \quad \text{[Equation 6]}$$

$$\#_{s_0}(s_p, s_c) = |\{(t_p, t_c) \mid t_p, t_c \in T_{s_0}, \quad \text{[Equation 7]}$$
$$p(t_c) = t_p, serv(t_c) = s_c, serv(t_p) = s_p\}|$$

$$\pi_{s_0}(s_c \mid s_p) = \frac{\#_{s_0}(s_p, s_c)}{\#_{s_0}(s_p)} \quad \text{[Equation 8]}$$

In order to calculate these parameters, the calling frequency calculation unit 340 performs the following processing. First, in the case where, when the starting point service $s_o$ is called once, the other transactions are sequentially called in a chained manner as a result of the calling, the calling frequency calculation unit 340 calculates the calling frequency of each transaction t by Equation (9). Note that a value of Equation (9) when the service of the transaction t itself is the starting point service $s_o$ is set at 1. Here, the calling frequency calculation unit 340 first calculates the calling frequency concerned for the parent transaction, and subsequently, sequentially calculates the calling frequencies concerned for the child transactions. Specifically, the calling frequency calculation unit 340 may previously perform topological sort (phase array) for data with the DAG structure, which indicates the candidate for the child transaction of each transaction, and may sequentially calculate the calling frequencies in an array sequence of the phase array.

$$\tau_{s_0}(t) = \max\left\{\sum_{s_p \in Serv(P(t))} \eta(s_p \mid t)\right. \quad \text{[Equation 9]}$$
$$\left(\sum_{\{t_p \mid t_p \in P(t), serv(t_p) = s_p\}} \frac{\tau_{s_0}(t_p)}{|\{t_p \mid t_p \in P(t), serv(t_p) = s_p\}|}\right),$$
$$\left. I(serv(t) = s_0)\right\}$$

In this processing, the candidate for the child transaction of each transaction is the other transaction, which defines the server device that is the call destination of the transaction concerned as the call origination, and starts after the start time of the transaction concerned and finishes before the finish time thereof. Hence, in the case where the first transaction, the second transaction starting after the first transaction and finishing before the first transaction and the third transaction starting after both of the first and second transactions and finishing before both thereof are detected, both of the second transaction and the third transaction are the child transactions of the first transaction.

Instead of this, the calling frequency calculation unit 340 may treat the third transaction as a candidate for the child transaction of the second transaction, and may treat the third transaction as one to be excluded from the candidate for the child transaction of the first transaction.

Then, in the case where the starting point service $s_o$ is called once, the calling frequency calculation unit 340 calculates, by the following Equation (10), a calling frequency at which the transaction t is called from the parent service $S_p$ by a call derived from the call concerned. Here, $\eta(s_p|t)$ represents the transaction calling probability value converged together with the service calling probability value.

$$\phi_{s_0}(s_p \mid t) = \quad \text{[Equation 10]}$$
$$\sum_{\{t_p \mid t_p \in P(t), serv(t_p) = s_p\}} \frac{\eta(s_p \mid t)\tau_{s_0}(t_p)}{|\{t_p \mid t_p \in P(t), serv(t_p) = s_p\}|}$$

Based on the parameters calculated above, the calling frequency calculation unit 340 calculates, by the following Equation (11), a frequency at which the service s is called in the case where the starting point service $s_o$ is called. Moreover, the calling frequency calculation unit 340 calculates, by Equation (12), a calling frequency at which the service $s_c$ is called in the processing of the service $s_p$ in the case where the starting point service $s_o$ is called.

$$\#_{s_0}(s) = \sum_{\{t \mid serv(t)=s\}} \tau_{s_0}(t) \quad \text{[Equation 11]}$$

$$\#_{s_0}(s_p \mid s_c) = \sum_{\{t \mid serv(t)=s\}} \phi_{s_0}(s_p \mid t) \quad \text{[Equation 12]}$$

In such a way, based on the transaction calling probability value and the candidates for the child transactions, the calling frequency calculation unit 340 can calculate the service calling frequencies in the case where, as a result of that a certain service is called, the other services are sequentially called in a chained manner. In this case, as shown in Equation (9) and Equation (10), the calling frequency calculation unit 340 requires the transaction calling probability value for each transaction. Hence, even in the case where the calling frequency calculation unit 340 allows each of the server programs to calculate the transaction calling probability value thereof, it is necessary for the calling frequency calculation unit 340 to collect the transaction calling probability value allowed to be calculated. For this reason, there is a possibility that an increase of network traffic may be brought about.

Meanwhile, according to the following method, the calling frequency calculation unit 340 can calculate, without increasing the network traffic, the service calling frequencies in the case where, as a result of that a certain service is called, the other services are sequentially called in a chained manner. This method will be described below. First, for the sake of convenience in description, the estimated values of the number of times, which are calculated by Equation (4), are represented as a matrix in Equation (13).

$$[\prod]_{i,j} = \pi(s_i \mid s_j) \quad \text{[Equation 13]}$$

Moreover, a vector of a magnitude $|S|$, which indicates the number of times in which each service is called, is defined as v. Then, because a state where a certain service is called once is an initial state, if the starting point service is defined as $s_i$, v in the initial state is represented by Equation (14) indicating that only an i-th element is 1 and that the other elements are 0.

$$v_{s_i}$$ [Equation 14]

Under the above premises, a limiting value of the number of times in which the respective services are sequentially called in the case where this starting point service $s_i$ is called once is represented by the following Equation (15). Then, Equation (15) can be transformed as shown in Equation (16).

$$v^* = \sum_{l=0}^{\infty} \prod {}^l v_{s_i}$$ [Equation 15]

$$v^* = v_{s_i} + \prod \left( I + \prod + \prod {}^2 + \ldots \right) v_{s_i}$$ [Equation 16]

$$= v_{s_i} + \prod v^*$$

$$= \left( I - \prod \right)^{-1} v_{s_i}$$

The calling frequency calculation unit 340 calculates Equation (16), and thus can calculate the estimated value of the number of times in which the respective services are sequentially called in the case where the starting point service $s_i$ is called once. Subsequently, based on this calculated estimated value and the number of times in which $s_i$ is actually called, the calling frequency calculation unit 340 can calculate a service calling frequency at which $s_j$ is actually called in the case where only the starting point service $s_i$ is called. Note that Equation (18) represents an i component of v*.

$$\#_{s_i}(s_j) = \frac{\#(s_i)}{v_i^*} \cdot v_j^*$$ [Equation 17]

$$v_i^*$$ [Equation 18]

In a similar way, a service calling frequency at which $S_k$ is called from $S_j$ in the case where the starting point service $s_i$ is called once is represented as Equation (19). Hence, the calling frequency calculation unit 340 can calculate, by Equation (20), a service calling frequency at which $S_k$ is actually called from $s_j$ in the case where only the starting point service $s_i$ is called.

$$\sum_{l=0}^{\infty} \pi_{kj} \cdot \left( \prod {}^l v_{s_i} \right)_j = \pi_{kj} \left( \sum_{l=0}^{\infty} \prod {}^l v_{s_i} \right)_j = \pi_{kj} \cdot v_j^*$$ [Equation 19]

$$\#_{s_i}(s_j, s_k) = \frac{\#(s_i)}{v_i^*} \cdot \pi_{kj} \cdot v_j^*$$ [Equation 20]

Figure 8:
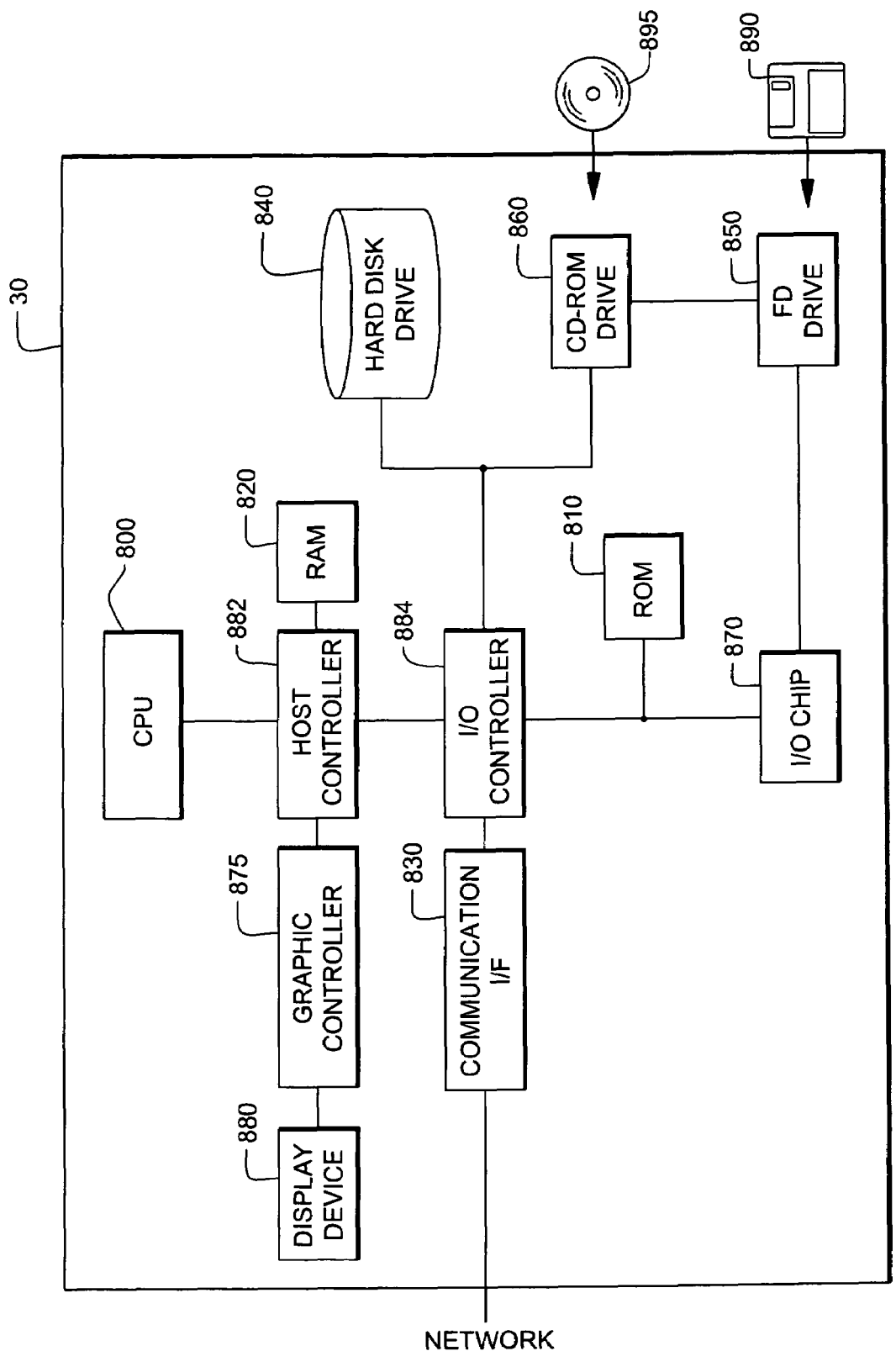
FIG. 8 illustrates an example of a hardware configuration of a computer functioning as the analysis system 30.

FIG. 8 illustrates an example of a hardware configuration of a computer functioning as the analysis system 30. The analysis system 30 includes a CPU peripheral portion, an input/output portion, and legacy input/output portion. The CPU peripheral portion has a CPU 800, a RAM 820, a graphic controller 875, and a display device 880, which are interconnected by the host controller 882. The input/output portion has a communication interface 830, a hard disk drive 840, and a CD-ROM drive 860, which are connected to the host controller 882 by an input/output controller 884. The legacy input/output portion has a ROM(BIOS) 810, a flexible disk drive 850, and an input/output chip 870, which are connected to the input/output controller 884.

The host controller 822 connects the RAM 820 to the CPU 800 and the graphic controller 875, which access the RAM 820 at a high transfer rate. The CPU 800 operates based on programs stored in the ROM 810 and the RAM 820, and controls the respective portions. The graphic controller 875 acquires image data which the CPU 800 and the like create on a frame buffer provided in the RAM 820, and allows the display device to display an image. Instead of this, the graphic controller 875 may include therein the frame buffer which stores the image data created by the CPU 800 and the like.

The input/output controller 884 connects the host controller 882 to the communication interface 830, the hard disk drive 840, and the CD-ROM drive 860, which are relatively high-speed input/output devices. The communication interface 830 communicates with an external device through a network. The hard disk drive 840 stores a program and data for use in the analysis system 30. The CD-ROM drive 860 reads a program or data from a CD-ROM 895, and provides the program or the data to the input/output chip 870 through the RAM 820.

Moreover, to the input/output controller 884, connected are the ROM 810, and relatively low-speed input/output devices such as the flexible disk drive 850 and the input/output chip 870. The ROM 810 stores a boot program executed by the CPU 800 at activation of the analysis system 30, a program depending on the hardware of the analysis system 30, and the like. The flexible disk drive 850 reads a program or data from a flexible disk 890, and provides the program or the data to the input/output chip 870 through the RAM 820. To the analysis system 30, the input/output chip 870 connects the flexible disk 890 and a variety of input/output devices through, for example, a parallel port, a serial port, a keyboard port, a mouse port and the like.

The programs provided to the analysis system 30 are stored in a recording medium such as the flexible disk 890, the CD-ROM 895 and an IC card, and are provided to a user. The programs are read out from the recording medium through the input/output chip 870 and/or the input/output controller 884, installed into the analysis system, and then executed.

The programs installed into the analysis system 30 and executed include a transaction detection module, a child transaction candidate detection module, a transaction calling probability calculation module, a service calling frequency candidate calculation module, and a calling frequency calculation module. Operations which the respective modules allow the analysis system 30 to perform by making an approach thereto are the same as the operations of the corresponding members in the analysis system described in FIGS. 1 to 5, and therefore, description thereof will be omitted.

The programs or the modules, which are described above, may be stored in an external recording medium. Besides the flexible disk 890 and the CD-ROM 895, as the recording medium, an optical recording medium such as a DVD and a PD, a magneto-optical medium such as an MD, a tape medium, a semiconductor memory such as an IC card, and the like can be used. Moreover, by using, as the recording medium, a storage device, such as a hard disk and a RAM, which is provided in a server system connected to a dedicated communication network or the Internet, the programs maybe provided to the analysis system 30 through the network.

As described above in this embodiment, the analysis system 30 analyzes the frequencies at which the respective server programs operating on the respective servers in the computer system 10 call one another. Thus, that the configuration of the network in the computer system 10 has been changed, or that the setting of the server programs operating in the computer system 10 has been changed, and the like, can be properly detected, and a burden on a network administrator can be reduced.

Moreover, the analysis system 30 can properly detect not only the communication failures of the network layer and the data link layer in the communication in the computer system 10 but also the communication failure of the application layer. Thus, for example, in the case where a failure occurs in the server program in the computer system 10, the analysis system 30 can properly detect the failure that has occurred in the server program in the computer system 10 even if a flow of the communication packets, which is reduced due to the failure, is slight.

Although the present invention has been described above by using the embodiment, the technical scope of the present invention is not limited to the scope described above in the embodiment. It is apparent to those skilled in the art that it is possible to add various alterations or modifications to the above-described embodiment. It is apparent from description in the scope of claims that modes added with such alterations or modifications as described above can be incorporated in the technical scope of the present invention.

According to the embodiment described above, analysis systems, an analysis method, an analysis program, and a recording medium, which are described in the following respective Items, are realized.

(Item 1) In a computer system in which a plurality of server programs providing services to one another operate, an analysis system for analyzing dependencies among the server programs, comprising: a transaction detection unit for detecting transactions in association with a service which each of the plurality of server programs performs by being called from any other server program, the transaction being processing of the service; a child transaction candidate detection unit for detecting candidates for a child transaction of each transaction detected by the transaction detection unit, the child transaction being another transaction called in the transaction; and a calling frequency calculation unit for calculating and outputting service calling frequencies obtained by estimating a frequency at which each server program allows each of the other server programs to perform a service by calling the other program, the estimation being made based on the service detected in association with each transaction and on a service detected in association with the candidate for the child transaction of the transaction.

(Item 2) The analysis system according to Item 1, wherein each of the plurality of server programs operates in any of a plurality of server devices owned by the computer system, the transaction detection unit further detects, in association with each transaction, identification information of server devices that are a call origination and call destination of the transaction, and for each transaction detected by the transaction detection unit, the child transaction candidate detection unit detects, as the candidate for the child transaction, each of the other transactions, which defines a server device that is a call destination of the transaction as a call origination.

(Item 3) The analysis system according to Item 2, wherein, when each server program performs the transaction by being called from any server program outside of the computer system, the transaction detection unit detects the same identification information as identification information of a call origination of the transaction.

(Item 4) The analysis system according to Item 2, wherein the plurality of server devices are interconnected by a network, and the transaction detection unit detects, from the network, a communication packet for use in calling the transaction in the computer system, detects an source IP address and destination IP address of the detected communication packet as the identification information of the server devices that are the call origination and call destination of the transaction, and detects a service identified by a destination port number of the communication packet as a service performed by the transaction.

(Item 5) The analysis system according to Item 1, wherein the transaction detection unit further detects a start time and finish time of each transaction in association therewith, and for each transaction detected by the transaction detection unit, the child transaction candidate detection unit detects, as the candidate for the child transaction, another transaction starting after the start time of the transaction and finishing before the finish time thereof.

(Item 6) The analysis system according to Item 5, wherein, when the transaction detection unit detects a first transaction, a second transaction starting after the first transaction and finishing before the first transaction, and a third transaction starting after both of the first and second transactions and finishing before both of the first and second transactions, the child transaction candidate detection unit detects the third transaction as a candidate for a child transaction of the second transaction, and excludes the third transaction from a candidate for a child transaction of the first transaction.

(Item 7) The analysis system according to Item 1, wherein, for each service program, a service calling probability value that is a estimated value for a probability at which the service program is called from each of the other service programs is predetermined, the analysis system further comprises: a transaction calling probability value calculation unit for calculating, based on the service calling probability value, a transaction calling probability value that is a probability at which each transaction is called from each of the plurality of server programs; and a service calling probability value calculation unit for calculating, based on the transaction calling probability value for each transaction performing the same service, another service calling probability value, and the calling frequency calculation unit repeats processing of further allowing the transaction calling probability value calculation unit to calculate the transaction calling probability value based on the service calling probability value calculated by the service calling probability value calculation unit, and when a difference between a service calling probability value calculated before one step of the iteration and a service calling probability value calculated after one step of the iteration is converged within a predetermined range, calculates and outputs the service calling frequency based on the service calling probability values in which the difference is converged.

(Item 8) The analysis system according to Item 7, wherein, based on the transaction calling probability value for each transaction, the calling frequency calculation unit further calculates a calling frequency of each transaction when, as a result of that a predetermined transaction is called, the other transactions are called sequentially in a chained manner, and based on the calculated calling frequency of each transaction, calculates and outputs a service calling frequency when, as a result of that a predetermined starting point service is called, the other services are called sequentially in a chained manner.

(Item 9) The analysis system according to Item 7, wherein, based on the calculated service calling frequency, the calling frequency calculation unit further calculates and outputs a service calling frequency when, as a result of that a predetermined starting point service is called, the other services are called sequentially in a chained manner.

(Item 10) The analysis system according to Item 1, wherein the calling frequency calculation unit periodically calculates the service calling frequencies, and when the calculated service calling frequencies are different from a predetermined reference value by a predetermined difference value or more, further outputs a message to the effect that the service calling frequencies are different from the reference value.

(Item 11) In a computer system in which a plurality of server programs providing services to one another operate, an analysis method for analyzing dependencies among the server programs, comprising: a transaction detection step of detecting transactions in association with a service which each of the plurality of server programs performs by being called from any other server program, the transaction being processing of the service; a child transaction candidate detection step of detecting candidates for a child transaction of each transaction detected by the transaction detection step, the child transaction being another transaction called in the transaction; and a calling frequency calculation step of calculating and outputting service calling frequencies obtained by estimating a frequency at which each server program allows each of the other server programs to perform a service by calling the other program, the estimation being made based on the service detected in association with each transaction and on a service detected in association with the candidate for the child transaction of the transaction.

(Item 12) In a computer system in which a plurality of server programs providing services to one another operate, an analysis program for analyzing dependencies among the server programs by a computer, the program allowing the computer to function as: a transaction detection unit for detecting transactions in association with a service which each of the plurality of server programs performs by being called from any other server program, the transaction being processing of the service; a child transaction candidate detection unit for detecting candidates for a child transaction of each transaction detected by the transaction detection unit, the child transaction being another transaction called in the transaction; and a calling frequency calculation unit for calculating and outputting service calling frequencies obtained by estimating a frequency at which each server program allows each of the other server programs to perform a service by calling the other program, the estimation being made based on the service detected in association with each transaction and on a service detected in association with the candidate for the child transaction of the transaction.

(Item 13) A recording medium recording the analysis program according to Item 12.

Although the preferred embodiment of the present invention has been described in detail, it should be understood that various changes, substitutions and alternations can be made therein without departing from spirit and scope of the invention as defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented analysis system for analyzing dependencies among a plurality of server programs, said server programs providing services to one another operating in a computer system, said analysis system comprising:

a computer-implemented transaction detection unit for detecting transactions in association with a service which each of the plurality of server programs performs by being called from any other server program, the transaction being processing of the service;

a computer-implemented child transaction candidate detection unit for detecting candidates for a child transaction of each transaction detected by the transaction detection unit, the child transaction being another transaction called in the transaction; and a computer-implemented calling frequency calculation unit for calculating and outputting service calling frequencies obtained by estimating frequencies at which each server program allows each of the other server programs to perform a service by calling the other program, the estimation being made based on the service detected in association with each transaction and on a service detected in association with the candidate for the child transaction of the transaction, wherein, for each service program, a service calling probability value that is a estimated value for a probability at which the service program is called from each of the other service programs is predetermined, the analysis system further comprises:

a transaction calling probability value calculation unit for calculating, based on the service calling probability value, a transaction calling probability value that is a probability at which each transaction is called from each of the plurality of server programs; and a service calling probability value calculation unit for calculating, based on the transaction calling probability value for each transaction performing the same service, another service calling probability value, and the calling frequency calculation unit repeats processing of further allowing the transaction calling probability value calculation unit to calculate the transaction calling probability value based on the service calling probability value calculated by the service calling probability value calculation unit, and when a difference between a service calling probability value calculated before one step of the iteration and a service calling probability value calculated after one step of the iteration is converged within a predetermined range, calculates and outputs the service calling frequency based on the service calling probability values in which the difference is converged.

2. The analysis system according to claim 1, wherein each of the plurality of server programs operates in any of a plurality of server devices owned by the computer system, the transaction detection unit further detects, in association with each transaction, identification information of server devices that are a call origination and call destination of the transaction, and for each transaction detected by the transaction detection unit, the child transaction candidate detection unit detects, as the candidate for the child transaction, each of the other transactions, which defines a server device that is a call destination of the transaction as a call origination.

3. The analysis system according to claim 2, wherein, when each sewer program performs the transaction by being called from any server program outside of the computer system, the transaction detection unit detects the same identification information as identification information of a call origination of the transaction.

4. The analysis system according to claim 2, wherein the plurality of server devices are interconnected by a network, and the transaction detection unit detects, from the network, a communication packet for use in calling the transaction in the computer system, detects an source IP address and destination IP address of the detected communication packet as the identification information of the server devices that are the call origination and call destination of the transaction, and detects a service identified by a destination port number of the communication packet as a service performed by the transaction.

5. The analysis system according to claim 1, wherein the transaction detection unit further detects a start time and a finish time of each transaction in association therewith, and for each transaction detected by the transaction detection unit, the child transaction candidate detection unit detects, as the candidate for the child transaction, another transaction starting after the start time of the transaction and finishing before the finish time thereof.

6. The analysis system according to claim 5, wherein, when the transaction detection unit detects a first transaction, a second transaction starting after the first transaction and finishing before the first transaction, and a third transaction starting after both of the first and second transactions and finishing before both of the first and second transactions, the child transaction candidate detection unit detects the third transaction as a candidate for a child transaction of the second transaction, and excludes the third transaction from a candidate for a child transaction of the first transaction.

7. The analysis system according to claim 1, wherein, based on the transaction calling probability value for each transaction, the calling frequency calculation unit further calculates a calling frequency of each transaction when, as a result of that a predetermined transaction is called, the other transactions are called sequentially in a chained manner, and based on the calculated calling frequency of each transaction, calculates and outputs a service calling frequency when, as a result of that a predetermined starting point service is called, the other services are called sequentially in a chained manner.

8. The analysis system according to claim 1, wherein, based on the calculated service calling frequency, the calling frequency calculation unit further calculates and outputs a service calling frequency when, as a result of that a predetermined starting point service is called, the other services are called sequentially in a chained manner.

9. The analysis system according to claim 1, wherein the calling frequency calculation unit periodically calculates the service calling frequencies, and when the calculated service calling frequencies are different from a predetermined reference value by a predetermined difference value or more, further outputs a message to the effect that the service calling frequencies are different from the reference value.

10. An analysis method for analyzing dependencies among a plurality of server programs, said server programs providing services to one another operating in a computer system, said analysis method comprising:

a transaction detection step of detecting transactions in association with a service which each of the plurality of server programs performs by being called from any other server program, the transaction being processing of the service;

a child transaction candidate detection step of detecting candidates for a child transaction of each transaction detected by the transaction detection step, the child transaction being another transaction called in the transaction; and a calling frequency calculation step of calculating and outputting service calling frequencies obtained by estimating a frequency at which each server program allows each of the other server programs to perform a service by calling the other program, the estimation being made based on the service detected in association with each transaction and on a service detected in association with the candidate for the child transaction of the transaction, wherein, for each service program, a service calling probability value that is a estimated value for a probability at which the service program is called from each of the other service programs is predetermined, the analysis system further comprises:

a transaction calling probability value calculation unit for calculating, based on the service calling probability value, a transaction calling probability value that is a probability at which each transaction is called from each of the plurality of server programs; and a service calling probability value calculation unit for calculating, based on the transaction calling probability value for each transaction performing the same service, another service calling probability value, and the calling frequency calculation unit repeats processing of further allowing the transaction calling probability value calculation unit to calculate the transaction calling probability value based on the service calling probability value calculated by the service calling probability value calculation unit, and when a difference between a service calling probability value calculated before one step of the iteration and a service calling probability value calculated after one step of the iteration is converged within a predetermined range, calculates and outputs the service calling frequency based on the service calling probability values in which the difference is converged.

11. A program storage device readable by machine, tangibly embodying a program of instructions executable by the machine to perform method steps for analyzing dependencies among a plurality of server programs, said method steps comprising the steps of:

a transaction detection step of detecting transactions in association with a service which each of the plurality of server programs performs by being called from any other server program, the transaction being processing of the service;

a child transaction candidate detection step of detecting candidates for a child transaction of each transaction detected by the transaction detection step, the child transaction being another transaction called in the transaction; and a calling frequency calculation step of calculating and outputting service calling frequencies obtained by estimating a frequency at which each server program allows each of the other server programs to perform a service by calling the other program, the estimation being made based on the service detected in association with each transaction and on a service detected in association with the candidate for the child transaction of the transaction, wherein, for each service program, a service calling probability value that is a estimated value for a probability at which the service program is called from each of the other service programs is predetermined, the analysis system further comprises:

a transaction calling probability value calculation unit for calculating, based on the service calling probability value, a transaction calling probability value that is a probability at which each transaction is called from each of the plurality of server programs; and a service calling probability value calculation unit for calculating, based on the transaction calling probability value for each transaction performing the same service, another service calling probability value, and the calling frequency calculation unit repeats processing of further allowing the transaction calting probability value calculation unit to calculate the transaction calling probability value based on the service calling probability value calculated by the service calling probability value calculation unit, and when a difference between a service calling probability value calculated before one step of the iteration and a service calling probability value calculated after one step of the iteration is converged within a predetermined range, calculates and outputs the service calling frequency based on the service calling probability values in which the difference is converged.

12. The method according to claim 10, wherein each of the plurality of server programs operates in any of a plurality of server devices owned by the computer system, the transaction detection unit further detects, in association with each transaction, identification information of sewer devices that are a call origination and call destination of the transaction, and for each transaction detected by the transaction detection unit, the child transaction candidate detection unit detects, as the candidate for the child transaction, each of the other transactions, which defines a server device that is a call destination of the transaction as a call origination.

13. The method according to claim 10, wherein the transaction detection unit further detects a start time and a finish time of each transaction in association therewith; and, for each transaction detected by the transaction detection unit, the child transaction candidate detection unit detects, as the candidate for the child transaction, another transaction starting after the start time of the transaction and finishing before the finish time thereof.

14. The method according to claim 10, wherein the calling frequency calculation unit periodically calculates the service calling frequencies, and when the calculated service calling frequencies are different from a predetermined reference value by a predetermined difference value or more, further outputs a message to the effect that the service calling frequencies are different from the reference value.

* * * * *